United States Patent
Lin et al.

(10) Patent No.: US 12,183,029 B2
(45) Date of Patent: Dec. 31, 2024

(54) DEVICE POSITION CORRECTION METHOD AND DEVICE POSITION CORRECTION SYSTEM

(71) Applicant: HTC Corporation, Taoyuan (TW)

(72) Inventors: Ting-Wei Lin, Taoyuan (TW); Min-Chia Wei, Taoyuan (TW)

(73) Assignee: HTC Corporation, Taoyuan (TW)

( * ) Notice: Subject to any disclaimer, the term of this patent is extended or adjusted under 35 U.S.C. 154(b) by 371 days.

(21) Appl. No.: 17/898,724

(22) Filed: Aug. 30, 2022

(65) Prior Publication Data

US 2023/0267641 A1  Aug. 24, 2023

Related U.S. Application Data

(60) Provisional application No. 63/311,561, filed on Feb. 18, 2022.

(51) Int. Cl.
*G06T 7/73* (2017.01)
*G06F 3/16* (2006.01)
*G06V 40/10* (2022.01)
*G06V 10/40* (2022.01)

(52) U.S. Cl.
CPC .............. *G06T 7/73* (2017.01); *G06F 3/167* (2013.01); *G06V 40/11* (2022.01); *G06V 10/40* (2022.01)

(58) Field of Classification Search
None
See application file for complete search history.

(56) References Cited

U.S. PATENT DOCUMENTS

| | | | | |
|---|---|---|---|---|
| 2012/0249741 | A1* | 10/2012 | Maciocci | G06T 19/006 348/51 |
| 2015/0062010 | A1* | 3/2015 | Lin | G06F 3/017 345/157 |
| 2019/0343707 | A1* | 11/2019 | Riener | A61H 1/0244 |
| 2021/0008413 | A1 | 1/2021 | Asikainen et al. | |
| 2022/0386042 | A1* | 12/2022 | Rosenkranz | G10L 21/0232 |

FOREIGN PATENT DOCUMENTS

| | | |
|---|---|---|
| CN | 108304831 A | 7/2018 |
| CN | 111781656 A | 10/2020 |
| TW | 202040314 A | 11/2020 |

* cited by examiner

*Primary Examiner* — Haris Sabah
(74) *Attorney, Agent, or Firm* — Birch, Stewart, Kolasch & Birch, LLP

(57) ABSTRACT

A device position correction method applicable to a wearable device is provided. The device position correction method includes the following steps. A wearable device image is received. An object detector detects the wearable device position, which is the position in the wearable device image. A limb detection model detects a plurality of skeleton points and a limb position, which is the position of a limb in the wearable device image, in order to determine which body part corresponds to the limb. According to the skeleton points and the limb position, correction information related to the wearable device position is generated.

21 Claims, 6 Drawing Sheets

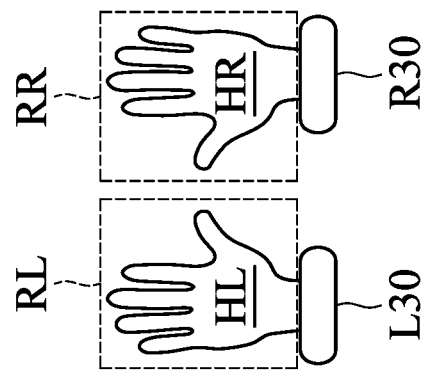
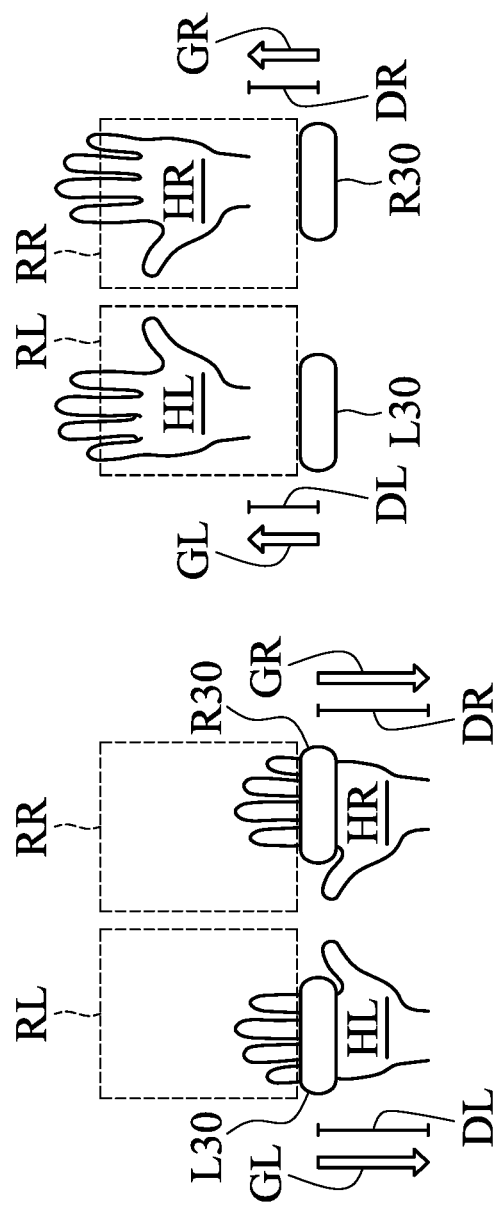
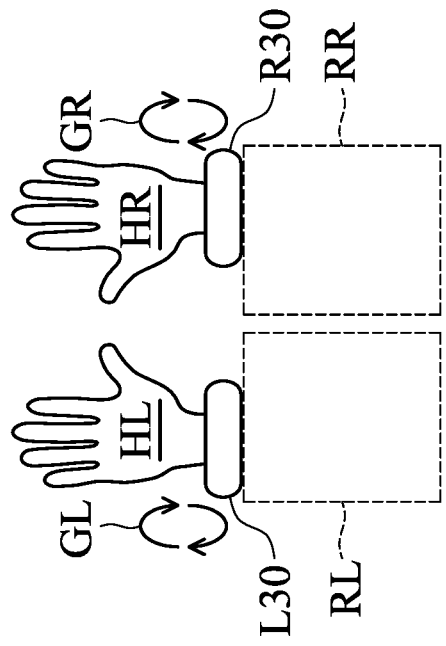
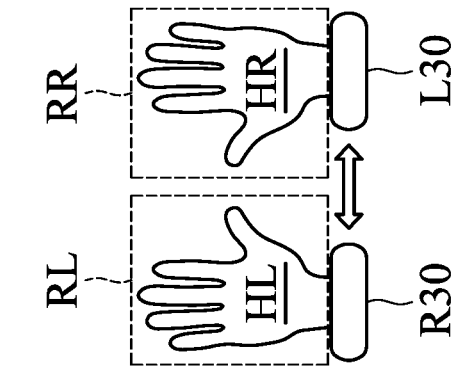

DEVICE POSITION CORRECTION METHOD AND DEVICE POSITION CORRECTION SYSTEM

BACKGROUND OF THE INVENTION

Field of the Invention

The present disclosure relates to a calibration method and, in particular, to a device position calibration method and a device position calibration system suitable for wearable devices.

Description of the Related Art

Generally speaking, the user of a virtual reality, augmented reality, or mixed reality (MR) device needs to wear a head-mounted display device together with a wearable device so that the user can experience scenes in virtual reality and make corresponding interactions with the prompts or objects in the scenes.

The wearable device may, for example, be a wristband or a finger ring, and the wearable device can be worn on a part of the user's body, such as a wrist, ankle, or finger. The head-mounted display device can be configured to operate with a specific wearable device that must be worn on a specific body part, for example, the left-hand bracelet should be worn on the user's left hand, and the right-hand bracelet should be worn on the user's right hand.

However, when the user wears the wearable device in an incorrect position, the head-mounted display device may be incorrectly recognized or operate incorrectly in virtual reality. For example, if the user incorrectly wears the left-hand bracelet on the right hand and the right-hand bracelet on the left hand, then the user will not receive the correct feedback when experiencing a scene in virtual reality.

Therefore, how to determine the current wearing position of the wearable device and guide the user to wear the wearable device correctly has become one of the problems to be solved in the art.

BRIEF SUMMARY OF THE INVENTION

In accordance with one feature of the present invention, the present disclosure provides a device position correction method applicable to a wearable device. The device position correction method includes the following steps. The device position correction method includes receiving a wearable device image. The device position correction method includes detecting a wearable device position in the wearable device image using an object detector. The device position correction method includes detecting a plurality of skeleton points and detecting the position of a limb in the wearable device image using a limb detection model to determine what body part corresponds to the limb. The device position correction method includes generating correction information related to the wearable device position according to the skeleton points and the limb position.

In one embodiment, the device position correction method further includes accessing the object detector and the limb detection model stored in a storage device to execute the object detector and the limb detection model using a processor that is inside a head-mounted display device.

In one embodiment, a processor calculates the separation distance according to limb size and limb root. When the distance between the wearable device position and the limb root is equal to the separation distance, and the body part is within the preset range, this indicates that the wearable device is being worn properly.

In one embodiment, when the distance between the wearable device position and the limb root is shorter than the separation distance, the processor sends a message to calibrate the wearable device downward through an audio prompt or an image prompt.

In one embodiment, when the distance between the wearable device position and the limb root is greater than the separation distance, the processor sends a message to calibrate the wearable device upward through an audio prompt or an image prompt.

In one embodiment, the limb detection model determines that the body part corresponding to the limb is a left limb, and a processor determines whether the position of a left limb wearable device is located on the left limb. When the processor determines that the position of the left limb wearable device is located on the left limb, and the left limb is within the preset range, a message indicating that it is being worn correctly is sent. When the processor determines that the position of the left limb wearable device is not located on the left limb, a message indicating that it is being worn incorrectly is sent.

In one embodiment, when the processor determines that the position of the left limb wearable device is located on a right limb, the processor exchanges a first identification code corresponding to a left body wearable device with a second identification code corresponding to a right body wearable device in a replacement program.

In one embodiment, when the processor determines that the position of a left body wearable device is located on a right limb, the processor exchanges a first feature code corresponding to the left body wearable device with a second feature code corresponding to a right body wearable device in a replacement program, to make sure that the first feature code records a right limb feature and the second feature code records a left limb feature.

In one embodiment, when the processor determines that the position of a left body wearable device is located on a right limb, the processor sends out a device-being-worn-incorrectly left-to-right error audio prompt or a device-being-worn-incorrectly left-to-right error image prompt.

In one embodiment, when the processor determines that the position of the left body wearable device is located on a left limb, but the position of the left body wearable device is inverted, the processor sends out a device-being-worn-inverted audio prompt or a device-being-worn-inverted image prompt.

In one embodiment, after the limb detection model detects the skeleton points of the limb in the wearable device image, a processor determines whether the distance between the wearable device position and a specific skeleton point is less than a specific distance. When the processor determines that the distance between the wearable device position and the specific skeleton point is not less than the specific distance, the processor sends a wearing error audio prompt or a wear error image prompt.

In accordance with one feature of the present invention, the present disclosure provides a device position correction system suitable for a wearable device. The device position correction system includes a head-mounted display device (HMD). The head-mounted display device includes a camera, a storage device and a processor. The camera is configured to capture a wearable device image. The processor is configured to access an object detector and a limb detection model stored in the storage device to execute the object detector and the limb detection model. The processor detects the wearable device position (which is the position in the wearable device image) using the object detector. The processor detects a plurality of skeleton points and the limb position of a limb in the wearable device image by using the limb detection model—it does this to determine which body part corresponds to the limb. The processor generates calibration information related the wearable device position based on the skeleton points and the limb position.

In one embodiment, the processor calculates the separation distance according to limb size and limb root. When the distance between the wearable device position and the limb root is equal to the separation distance, and the body part is within the preset range, this indicates that the wearable device is being worn properly.

In one embodiment, when the distance between the wearable device position and the limb root is shorter than the separation distance, the processor sends a message to calibrate the wearable device downward through an audio prompt or an image prompt.

In one embodiment, when the distance between the wearable device position and the limb root is greater than the separation distance, the processor sends a message to calibrate the wearable device upward through an audio prompt or an image prompt.

In one embodiment, the limb detection model determines that the body part corresponding to the limb is a left limb, and a processor determines whether the position of a left limb wearable device is located on the left limb; wherein when the processor determines that the position of the left limb wearable device is located on the left limb, and the left limb is within the preset range, a message indicating that it is being worn correctly is sent; wherein when the processor determines that the position of the left limb wearable device is not located on the left limb, a message indicating that it is being worn incorrectly is sent.

In one embodiment, when the processor determines that the position of the left limb wearable device is located on a right limb, the processor exchanges a first identification code corresponding to a left body wearable device with a second identification code corresponding to a right body wearable device in a replacement program.

In one embodiment, when the processor determines that the position of a left body wearable device is located on a right limb, the processor exchanges a first feature code corresponding to the left body wearable device with a second feature code corresponding to a right body wearable device in a replacement program, to make sure that the first feature code records a right limb feature and the second feature code records a left limb feature.

In one embodiment, when the processor determines that the position of a left body wearable device is located on a right limb, the processor sends out a device-being-worn-incorrectly left-to-right error audio prompt or a device-being-worn-incorrectly left-to-right error image prompt.

In one embodiment, when the processor determines that the position of the left body wearable device is located on a left limb, but the position of the left body wearable device is inverted, the processor sends out a device-being-worn-inverted audio prompt or a device-being-worn-inverted image prompt.

In one embodiment, after the limb detection model detects the skeleton points of the limb in the wearable device image, a processor determines whether the distance between the wearable device position and a specific skeleton point is less than a specific distance. When the processor determines that the distance between the wearable device position and the specific skeleton point is not less than the specific distance, the processor sends a wearing error audio prompt or a wear error image prompt.

To sum up, the embodiments of the present invention provides a device position correction method and a device position correction system. Through object detector and limb detection model, correction information about the wearable device position can be generated according to multiple skeleton points and limb positions. Thereby, the processor can determine whether the current wearing position of the wearable device is correct according to the correction information. When the processor determines that the current wearing position of the wearable device needs to be adjusted, the processor guides the user to wear the wearable device to the correct position according to the correction information. When the device position correction method and the device position correction system are applied to virtual reality, augmented reality and/or mixed reality systems, more precise control can be achieved and better user experience can be provided.

BRIEF DESCRIPTION OF THE DRAWINGS

The invention can be more fully understood by reading the subsequent detailed description and examples with references made to the accompanying drawings, wherein:

FIGS. 4A-4E are schematic diagrams of a device position correction method in accordance with one embodiment of the present disclosure.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
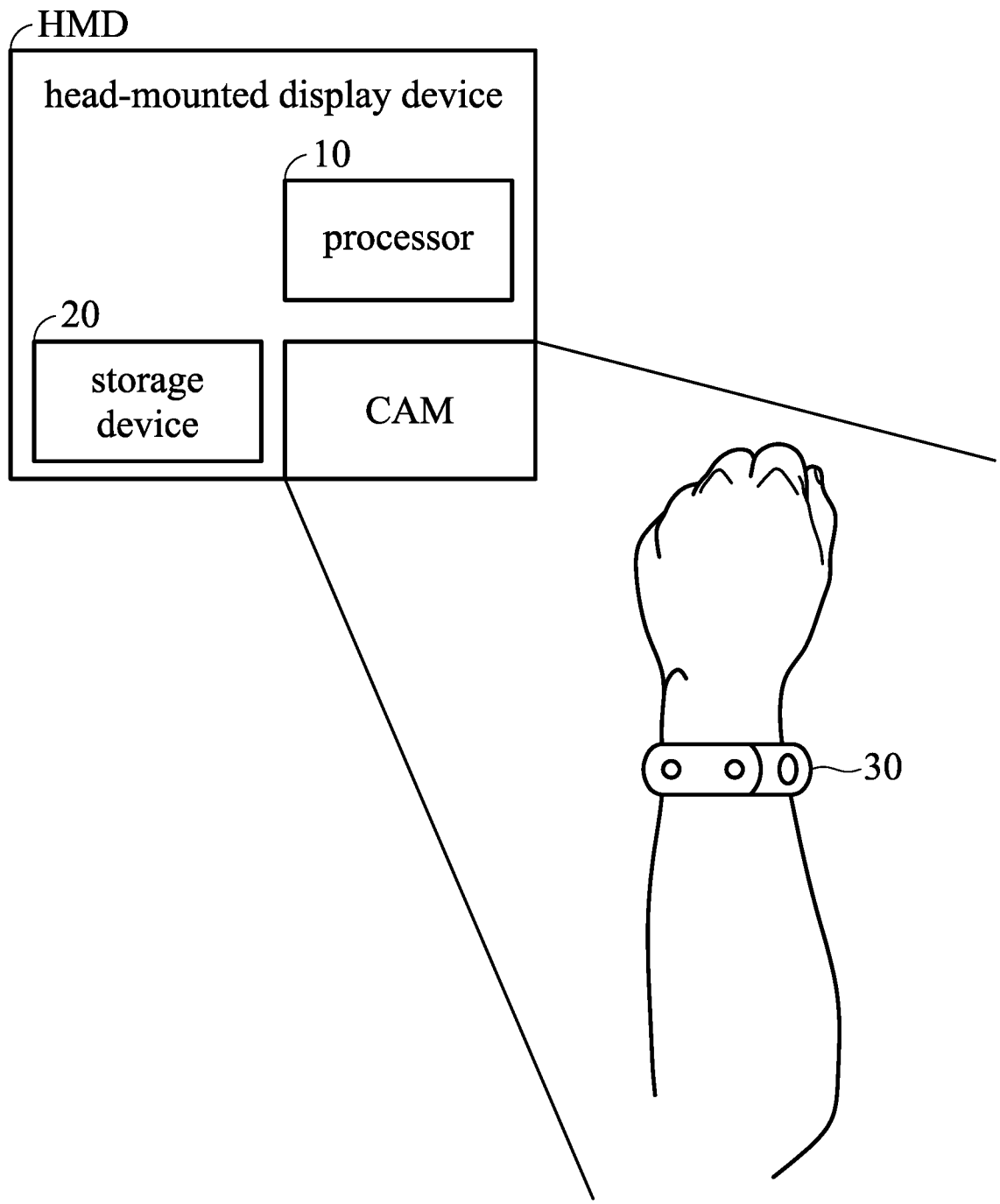
FIG. 1 is a schematic diagram of a device position correction system in accordance with one embodiment of the present disclosure.

Please refer to FIG. 1, FIG. 1 is a schematic diagram of a device position correction system 100 in accordance with one embodiment of the present disclosure. In one embodiment, the device position correction system 100 includes a head-mounted display device HMD. In one embodiment, the head-mounted display device HMD includes a camera CAM, a processor 10 and a storage device 20.

In one embodiment, the head-mounted display device HMD includes a plurality of cameras CAM. In one embodiment, a plurality of cameras CAM in the head-mounted display device HMD are arranged at different positions of the head-mounted display device HMD, and can be used for capturing environmental images.

In one embodiment, the storage device 20 in the head-mounted display device HMD can be implemented as a read-only memory, a flash memory, a floppy disk, a hard disk, an optical disk, a flash drive, a magnetic tape, a database accessible by network, or a person skilled in the art can easily think of storage media with the same features.

In one embodiment, the processor 10 in the head-mounted display device HMD can be implemented by an integrated circuit such as a micro controller, a microprocessor, a digital signal processor, an application specific integrated circuit (ASIC), or a logic circuit.

In one embodiment, the camera CAM is composed of at least one charge coupled device (CCD) or a complementary metal-oxide semiconductor (CMOS) sensor.

In one embodiment, a processor 10 in the head-mounted display device HMD is used to access an object detector and a limb detection model stored in a storage device 20 to execute the object detector and the limb detection model.

In one embodiment, the object detector can be a thread that is accessed and executed by the processor 10 in the head-mounted display device HMD from the storage device 20.

In one embodiment, the limb detection model can be a thread that is accessed and executed by the processor 10 in the head-mounted display device 10 from the storage device 20.

In one embodiment, the object detector can be implemented by a region-based convolutional neural networks (R-CNN) algorithm or other deep learning methods capable of frame-selecting specific objects.

In one embodiment, the limb detection model can be implemented by a region-based convolutional neural networks algorithm or other deep learning methods capable of outputting skeleton points and limb positions.

In one embodiment, the object detector is trained by using images of a plurality of objects preset in advance before the head-mounted display device HMD leaves the factory. The objects are, for example, various objects such as the wearable device 30, the controller, the mobile locator, etc. Until the training result converges, the training is regarded as completed. The trained object detector is stored in the storage device 20 in the head-mounted display device HMD. However, the invention is not limited to thereto, and the object detector can also be updated or trained according to the user's needs after leaving the factory.

In an embodiment, the trained object detector can also be implemented by a chip to become a hardware component in the head-mounted display device HMD.

In an embodiment, the object detector may also be implemented by a hardware circuit.

In one embodiment, after the head-mounted display device HMD leaves the factory, the display of the head-mounted display device HMD can display the detected position of the object. For example, the head-mounted display device HMD detects the position of the wearable bracelet 30 through the object detector.

In one embodiment, the device position correction system 100 includes a wearable device 30 (e.g., a wearable bracelet 30). In one embodiment, the head-mounted display device HMD and the wearable bracelet 30 can establish a communication connection through wired or wireless communication method.

In one embodiment, the limb detection model is trained by using images and/or skeleton feature points of a plurality of preset human body parts before the head-mounted display device HMD leaves the factory Human body parts can be understood as, for example, left palm, right palm, left wrist, right wrist, left ankle, right ankle, waist, left arm, right arm, left thigh, right thigh, each finger of the left hand, each finger of the right hand . . . etc. Until the training results converge, the training is regarded as complete. The trained limb detection model is stored in the storage device 20 in the head-mounted display device HMD. However, the invention is not limited thereto, and the limb detection model can also be updated or trained according to user needs after leaving the factory.

In one embodiment, the trained limb detection model can identify human skeleton points and human body parts in the image.

In one embodiment, the trained limb detection model can also be implemented by a chip, and become a hardware component in the head-mounted display device HMD.

In one embodiment, the limb detection model can also be implemented by a hardware circuit.

In one embodiment, after the head-mounted display device HMD leaves the factory, the detected human body can be displayed through the display of the head-mounted display device HMD. For example, the head-mounted display device HMD detects the position of the left palm through the limb detection model.

Figure 2:
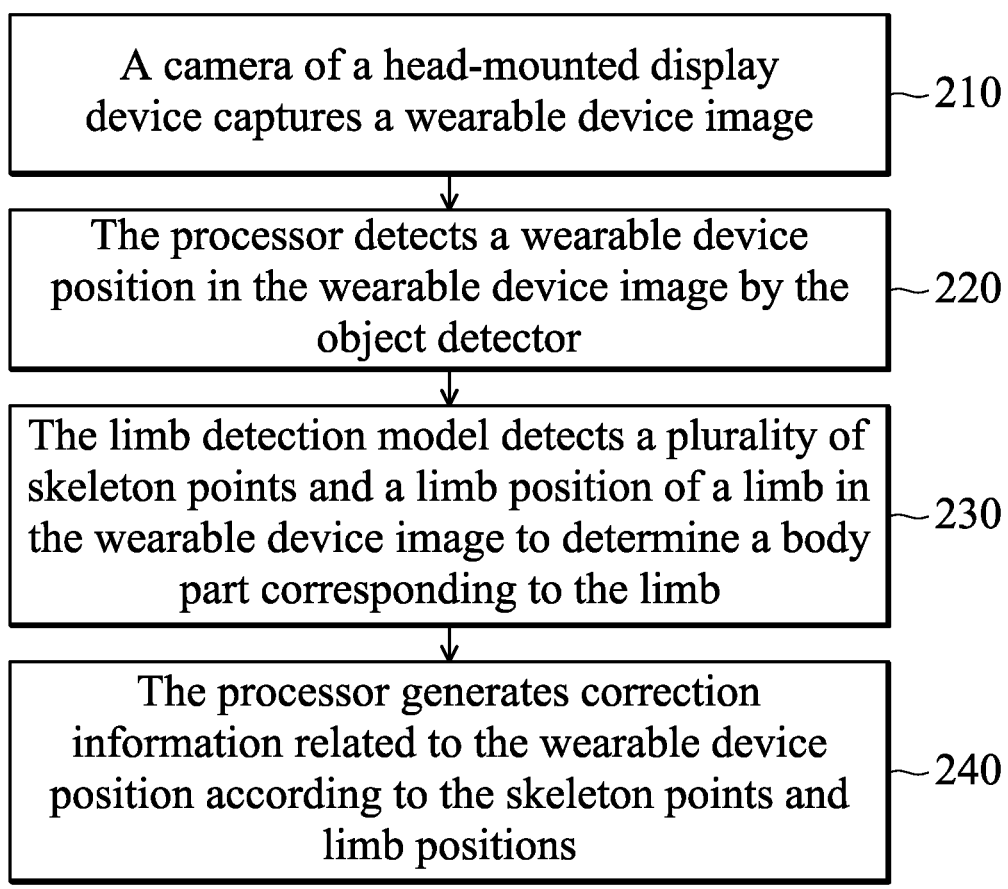
FIG. 2 is a flowchart of a device position correction method in accordance with one embodiment of the present disclosure.
Figure 3:
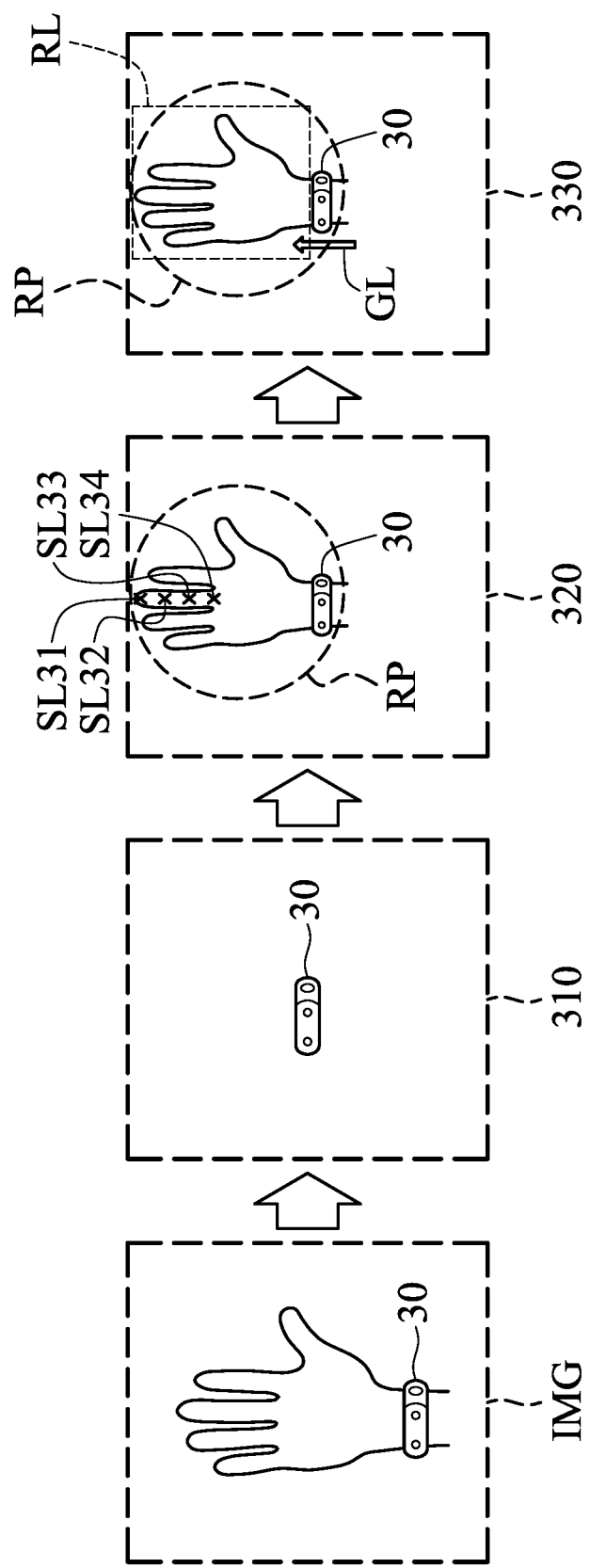
FIG. 3 is a schematic diagram of a device position correction method in accordance with one embodiment of the present disclosure.

Please refer to FIGS. 1 to 3 together. FIG. 2 is a flowchart of a device position correction method 200 in accordance with one embodiment of the present disclosure. The device position correction method 200 can be implemented by the device position correction system 100 shown in FIG. 1. FIG. 3 is a schematic diagram of a device position correction method 200 in accordance with one embodiment of the present disclosure.

In step 210, a camera CAM of a head-mounted display device HMD captures a wearable device image IMG.

In step 220, the processor 10 detects a wearable device position in the wearable device image IMG by the object detector.

As shown in the image 310 in FIG. 3, the object detector detects the wearable bracelet 30 in the wearable device image IMG.

In one embodiment, the wearable bracelet 30 is preset as a bracelet to be worn on the left hand, so the wearable bracelet 30 is marked with a symbol L. On the contrary, when the wearable bracelet 30 is preset to be worn on the right hand, the wearable bracelet 30 is marked with a symbol R. In this way, the object detector can also obtain the preset wearing position (for example, the left hand or the right hand) of the wearable bracelet 30 through the captured wearable bracelet 30.

In one embodiment, the processor 10 can also use any conventional image recognition algorithm to recognize the symbols on the wearable bracelet 30 to obtain the preset wearing position of the wearable bracelet 30 (for example, left or right hand).

In step 230, the limb detection model detects a plurality of skeleton points (such as the skeleton points SL31-SL34 of the left middle finger) and a limb position (such as the left hand position RP) of a limb in the wearable device image IMG to determine a body part corresponding to the limb.

In one embodiment, as shown in the image 320 in FIG. 3, the limb position RP can selectively include the position of the wearable bracelet 30.

In one embodiment, the limb detection model detects a limb in the image 320, detects the relative position of the limb in the image 320, such as the limb position RP, and detects the limb middle finger skeleton points SL31-SL34.

In one embodiment, the limb detection model can directly recognize from the output image of the image 320 that the body part corresponding to the limb is the left hand. Or, the processor 10 can also compare the limb in the image with a plurality of human body parts through traditional image recognition technology, so as to identify the human body part corresponding to the limb in the image as the left hand.

In one embodiment, the limb detection model can output at least more than 20 skeleton points of the left hand, and according to the plurality of skeleton points, the limb detection model can also determine that the body part corresponding to the limb is the left hand.

In step 240, the processor 10 generates correction information related to the wearable device position according to the skeleton points (e.g., left middle finger skeleton points SL31-SL34) and limb positions (e.g., left hand position RP).

In one embodiment, the correction information can be a preset range and/or calibration message, for example, the preset range RL of the left hand, the upward calibration message GL of the wearable device, and the like.

In one embodiment, the processor 10 determines whether the current wearing position of the wearable device is correct according to the correction information. When the processor 10 determines that the current wearing position of the wearable device needs to be adjusted, the processor 10 guides the user to wear the wearable device to the correct position according to the correction information.

Thereby, the processor 10 can apply the correction information, and display the preset range and/or calibration message through the display, so that the user can know the relationship between the body part and the wearable device position (such as the wearable bracelet 30). Moreover, the wearable device position can be adjusted according to the preset range and/or calibration message.

In one embodiment, as shown in image 330 in FIG. 3, when the processor 10 determines that the position of the wearable bracelet 30 is too far from the root of the left hand, it will display correction information through the display, for example, a message for calibrating the wearable device upward GL.

In one embodiment, as shown in image 330 in FIG. 3, the processor 10 calculates the separation distance (it is marked with DR and/or DL in subsequent FIGS. 4A-4E and 5A-5E) according to limb size (e.g., palm size) or limb root (e.g., finger root). When the distance between the wearable device position and the limb root is equal to the separation distance, and the body part is within the preset range RL, this means that the wearable device is being worn properly.

In one embodiment, when the processor 10 learns that the limb is the left hand, it can know from the known information that the wearable bracelet 30 should be worn about two centimeters below the root of the left palm. In one embodiment, if the wearable bracelet 30 is just at the root of the left palm, the flexibility of the user's operation may be affected. In one embodiment, if the wearable bracelet 30 is too far away from the root of the left palm, the head-mounted display device HMD may be inaccurate in determining the user's action.

In one embodiment, the limb detection model can output the palm root position, for example, marked on the output image or marked with coordinates.

In one embodiment, the processor 10 can know the position where the wearable bracelet 30 should be worn from the information output by the limb detection model. Or, the position where the wearable bracelet 30 should be worn is calculated in advance from the storage device 20 according to a plurality of palm sizes.

Please refer to FIGS. 4A-4E, which are schematic diagrams of a device position correction method 200 in accordance with one embodiment of the present disclosure.

In one embodiment, the device position correction method 200 can support multiple wearable devices (e.g., a wearable left-hand bracelet L30, a wearable right-hand bracelet R30).

In one embodiment, as shown in FIG. 4A, when the distance between the position of the wearable device (such as the wearable left-hand bracelet L30 and the wearable right-hand bracelet R30) and the limb root (such as the palm root of the left hand HL and the palm root of the right hand HR) is shorter than the separation distance, the processor 10 sends out a message to calibrate the wearable device downward (e.g., the indicator GL and the indicator GR) through an audio prompt or an image prompt.

In addition, in this example, the processor 10 also detects that the left hand HL is not within the preset range RL, and the right hand RL is not within the preset range RR, so the processor 10 determines that the user is not ready to wear type device.

In one embodiment, as shown in FIG. 4B, when the distance between the wearable device position (such as the wearable left-hand bracelet L30 and the wearable right-hand bracelet R30) and the limb root (such as the palm root of the left hand HL and the palm root of the right hand HR) is greater than the separation distance (such as the separation distance DL and the separation distance DR), the processor 10 sends a message to calibrate the wearable device upward (such as the indicator GL and the indicator GR) through an audio prompt or an image prompt.

In one embodiment, as shown in FIG. 4C, the limb detection model determines that the body part corresponding to the limb is a left limb (such as the left hand HL), then the processor 10 determines that whether the position of a left body wearable device (e.g., the wearable left hand bracelet L30) is located on the left limb. In one embodiment, when the processor 10 determines that the position of the left body wearable device is located on the left limb, and the left limb is located within the preset range RL, the processor 10 sends a message indicating that it is being worn correctly.

In one embodiment, as shown in FIG. 4C, the limb detection model determines that the body part corresponding to the limb is a right limb (such as the right hand HR), then the processor 10 determines that whether the position of a right body wearable device (e.g., the wearable right hand bracelet R30) is located on the right limb. In one embodiment, when the processor 10 determines that the position of the right body wearable device is located on the right limb, and the right limb is located within the preset range RR, the processor 10 sends a message indicating that it is being worn correctly.

In one embodiment, as shown in FIG. 4D, when the processor 10 determines that the position of the left body wearable device (such as the wearable left hand bracelet L30) is not located on the left limb (such as the left hand HL), the processor 10 sends a message indicating that it is being worn incorrectly. For example, if the position of the wearable left hand bracelet L30 is on the right hand HR, the processor 10 sends a message indicating that it is being worn incorrectly.

In one embodiment, as shown in FIG. 4D, when the processor 10 determines that the position of the right body wearable device (such as the wearable right hand bracelet R30) is not located on the right limb (such as the left hand HR), the processor 10 sends a message indicating that it is being worn incorrectly. For example, if the position of the wearable right hand bracelet R30 is on the left hand HL, the processor 10 sends a message indicating that it is being worn incorrectly.

In one embodiment, as shown in FIG. 4D, when the processor 10 determines that the position of the left body wearable device (such as the wearable left hand bracelet L30) is located on a right limb (such as the right hand HR), the processor 10 exchanges a first identification code corresponding to a left body wearable device (such as the wearable left hand bracelet L30) with a second identification code corresponding to a right body wearable device (such as the wearable right hand bracelet R30) in a replacement program.

For example, the processor 10 changes the first identification code from ID_R to ID_L, and changes the second identification code from ID_L to ID_R. When the processor 10 subsequently calls the first identification code ID_L, it corresponds to the left body wearable device, and when the processor 10 calls the second identification code ID_R, it corresponds to the right body wearable device.

By exchanging the identification code of the wearable device on the software side, the user does not need to take off the wearable device and then change the position to put it on again. After that, the updated identification code can be used to identify each wearable device.

In one embodiment, when the processor 10 determines that the position of the left body wearable device (such as the wearable left hand bracelet L30) is located on a right limb (such as the right hand HR), the processor 10 exchanges a first feature code corresponding to the left body wearable device (e.g., the wearable left hand bracelet L30) with a second feature code corresponding to a right body wearable device (e.g., the wearable right hand bracelet R30) in a replacement program, to make sure that the first feature code records a right limb feature and the second feature code records a left limb feature.

In one embodiment, the limb features include information such as the position of each skeleton point, the size of the limb, the skin color of the limb, the shape of the limb, the location of the limb, and so on.

In one embodiment, the original first feature code corresponds to the skeleton point feature of the left hand and the position information of the left hand (for example, the position information in the preset range RL). The original second feature code corresponds to the skeleton point feature of the right hand and the position information of the right hand (for example, the position information in the preset range RR).

By exchanging the feature code of the wearable device on the software side, the user does not need to take off the wearable device and then change the position to put it on again. The swapped feature codes can be used to identify each wearable device subsequently.

In one embodiment, when the processor 10 determines that the position of the left limb wearable device (e.g., the wearable left hand bracelet L30) is located on a right limb (such as the right hand HR), the processor 10 sends out a device-being-worn-incorrectly left-to-right error audio prompt or a device-being-worn-incorrectly left-to-right error image prompt.

In one embodiment, as shown in FIG. 4E, when the processor 10 determines that the position of the left limb wearable device (e.g., the wearable left hand bracelet L30) is located on a left limb (e.g., the left hand HL), but the position of the left limb wearable device is inverted, that is, upside down, then, the processor 10 sends out a device-being-worn-inverted audio prompt or a device-being-worn-inverted image prompt (e.g., the indicator GL and the indicator GR).

FIG. 3 and FIGS. 4A to 4E take the hand as an example, however, the present invention is not limited thereto, and the above method can be adapted to any body part.

In addition, the indicators mentioned in the present invention are all used for prompting the user to calibrate or adjust the position of the wearable device.

Please refer to FIGS. 5A-5E, which are schematic diagrams of a device position correction method 200 in accordance with one embodiment of the present disclosure. The wearable devices in FIGS. 5A to 5E are finger rings, such as the left finger ring L30 and the right finger ring L30. Generally speaking, the processor 10 presets the correct wearing positions of the left finger ring L30 and the right finger ring L30 in advance. The correct wearing positions must each be at a specific distance below the third skeleton point SL33 from the top to the bottom of the left middle finger and a specific distance below the third skeleton point SR33 from the top to the bottom of the right middle finger.

Figure 5A:
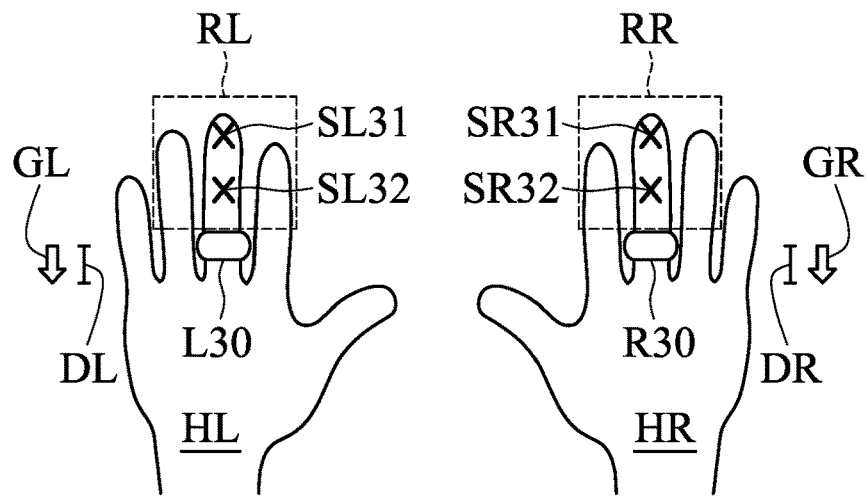
FIGS. 5A-5E are schematic diagrams of a device position correction method in accordance with one embodiment of the present disclosure.

In one embodiment, as shown in FIG. 5A, the processor 10 determines that the left finger ring L30 and the right finger ring L30 are respectively worn on the skeleton point SL33 and the skeleton point SR33, not at a specific distance below the third skeleton point SL33 from the top to the bottom of the left middle finger and a specific distance below the third skeleton point SR33 from the top to the bottom of the right middle finger. Therefore, the processor 10 sends out a wearing error audio prompt or a wearing error image prompt (for example, the indicator GR indicates that the user is instructed to move the right finger ring R30 down the distance DR, and the indicator GL indicates that the user is instructed to move the left finger ring L30 down the distance DL).

In one embodiment, after the limb detection model detects a plurality of skeleton points of the limb in the wearable device image, the processor 10 determines whether the distance between a wearable device position of a wearable device and a specific skeleton point is less than a specific distance. When the processor 10 determines that the distance between the wearable device position of a wearable device and the specific skeleton point is not less than the specific distance, the processor 10 sends out a wearing error audio prompt or a wearing error image prompt.

Figure 5B:
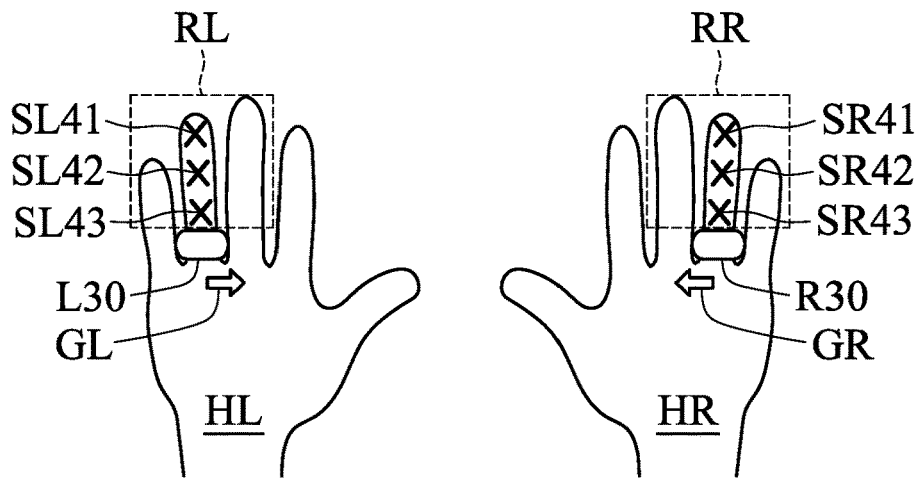

For example, as shown in FIG. 5B, the position of the left finger ring L30 is below the skeleton point SL43, not below SL33, at this time, the processor 10 determines that the distance between the wearable device position of the left finger ring L30 and the specific skeleton point SL33 is not less than the specific distance (for example, the distance between the skeleton point SL33 of the middle finger and the skeleton point SL43 of the ring finger). Then, the processor 10 sends out a wearing error audio prompt or a wearing error image prompt (e.g., the indicator GL). Similarly, the position of the right finger ring R30 is below the skeleton point SR43, not below SR33, at this time, the processor 10 determines that the distance between the wearable device position of the right finger ring R30 and the specific skeleton point SR33 is not less than the specific distance (for example, the distance between the skeleton point SR33 of the middle finger and the skeleton point SR43 of the ring finger). Then, the processor 10 sends out a wearing error audio prompt or a wearing error image prompt (e.g., the indicator GL).

Figure 5C:
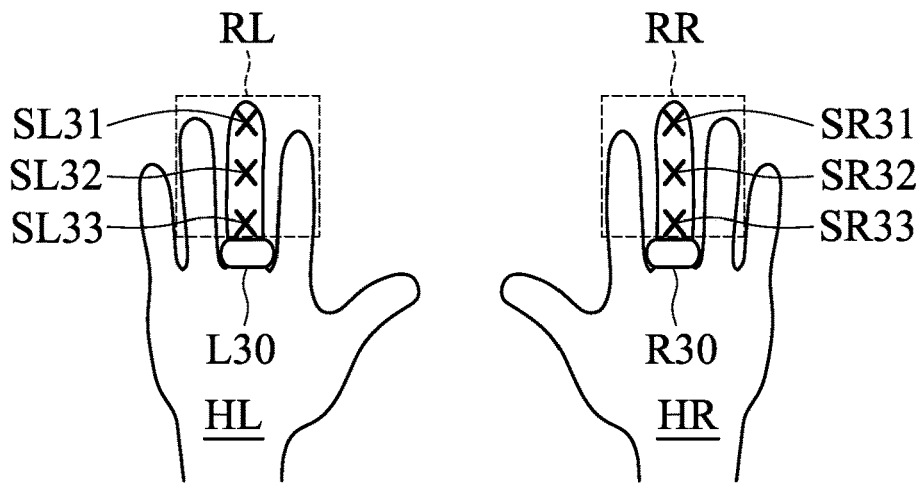

In one embodiment, as shown in FIG. 5C, the processor 10 determines that the position of the left limb wearable device (e.g., the left finger ring L30) is located on the left limb (e.g., at a specific distance below the skeleton point SL33), and the left limb is within the preset range RL, a message indicating that it is being worn correctly is sent (representing that the position correction of the wearable device on the left hand HL is completed). In one embodiment, the processor 10 determines that the position of the right limb wearable device (e.g., the right finger ring R30) is located on the left limb (e.g., at a specific distance below the skeleton point SR33), and the left limb is within the preset range RR, a message indicating that it is being worn correctly is sent (representing that the position correction of the wearable device on the right hand HR is completed).

Figure 5D:
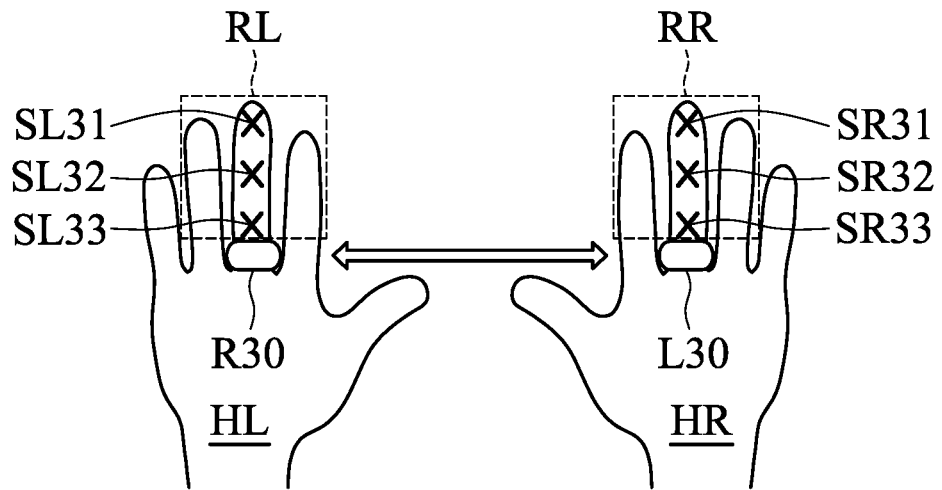

In one embodiment, as shown in FIG. 5D, the left finger ring L30 is worn on the right hand HR, and the right finger ring R30 is worn on the left hand HK, and the processor 10 determines that the wearing positions of the two need to be interchanged, then the processor 10 sends out a wearing error audio prompt or a wearing error image prompt to prompt the user to exchange the position of the left finger ring L30 and the right finger ring R30.

In one embodiment, when the processor 10 determines that the position of the left finger ring L30 is located on the right hand HR, the processor 10 exchanges a first identification code corresponding to the left finger ring L30 with a second identification code corresponding to the right finger ring R30 in a replacement program.

For example, the processor 10 changes the first identification code from ID_R to ID_L, and changes the second identification code from ID_L to ID_R. When the processor 10 subsequently calls the first identification code ID_L, it corresponds to the left body wearable device (such as the left ring L30), and when the processor 10 calls the second identification code ID_R, it corresponds to the right body wearable device (such as the right ring R30).

In one embodiment, when the processor 10 determines that the position of the left finger ring L30 is located on the right hand HR, the processor 10 exchanges a first identification code corresponding to the left limb wearable device (e.g., the left finger ring L30) with a second identification code corresponding to a right body wearable device (e.g., the right finger ring R30) in a replacement program. Moreover, the first feature code records a right limb feature, and the second feature code records a left limb feature.

By exchanging the identification code or feature code of the wearable device on the software side, the user does not need to take off the wearable device and then change the position to put it on again. The exchanged identification code or feature code can be used to identify each wearable device subsequently.

Figure 5E:
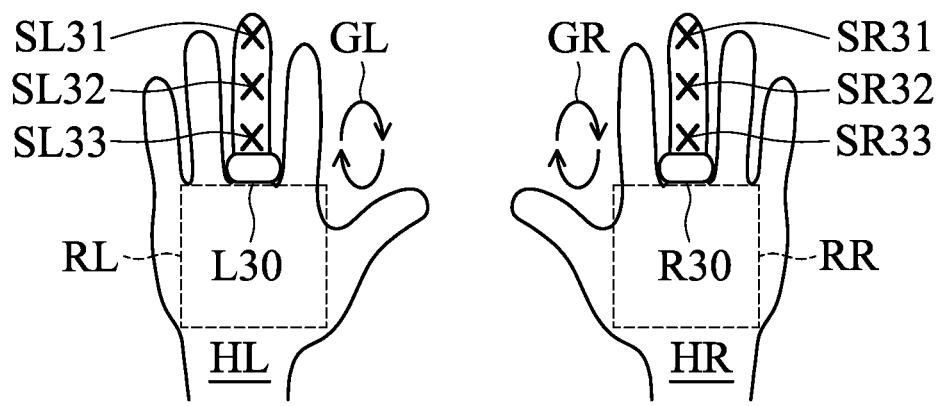

In one embodiment, as shown in FIG. 5E, when the processor 10 determines that the position of the left finger ring L30 is located on the left hand HL, but the position of the left finger ring L30 is inverted, the processor 10 sends out a device-being-worn-inverted audio prompt or a device-being-worn-inverted image prompt. It is used to prompt the user to adjust the direction of the left finger ring L30 by 180 degrees to correct the position of the left finger ring L30. In one embodiment, when the processor 10 determines that the position of the right finger ring R30 is located on the right hand HR, but the position of the right finger ring R30 is inverted, the processor 10 sends out a device-being-worn-inverted audio prompt or a device-being-worn-inverted image prompt. It is used to prompt the user to adjust the direction of the right finger ring R30 by 180 degrees to correct the position of the right finger ring R30.

To sum up, the embodiments of the present invention provides a device position correction method and a device position correction system. Through object detector and limb detection model, correction information about the wearable device position can be generated according to multiple skeleton points and limb positions. Thereby, the processor can determine whether the current wearing position of the wearable device is correct according to the correction information. When the processor determines that the current wearing position of the wearable device needs to be adjusted, the processor guides the user to wear the wearable device to the correct position according to the correction information. When the device position correction method and the device position correction system are applied to virtual reality, augmented reality and/or mixed reality systems, more precise control can be achieved and better user experience can be provided.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A device position correction method, applicable to a wearable device, the device position correction method comprising:
   receiving a wearable device image;
   detecting a wearable device position in the wearable device image with an object detector;
   detecting a plurality of skeleton points and a limb position of a limb in the wearable device image with a limb detection model to determine a body part corresponding to the limb; and
   according to the skeleton points and the limb position, generating a correction information related to the wearable device position.

2. The device position correction method of claim 1, further comprising:
   accessing the object detector and the limb detection model stored in a storage device to execute the object detector and the limb detection model by a processor in a head-mounted display device.

3. The device position correction method of claim 1, wherein a processor calculates a separation distance according to limb size and limb root;
   wherein when a distance between the wearable device position and the limb root is equal to the separation distance, and the body part is within the preset range, the wearable device is being worn properly.

4. The device position correction method of claim 3, wherein when the distance between the wearable device position and the limb root is shorter than the separation distance, the processor sends a message to calibrate the wearable device downward through an audio prompt or an image prompt.

5. The device position correction method of claim 3, wherein when the distance between the wearable device position and the limb root is greater than the separation distance, the processor sends a message to calibrate the wearable device upward through an audio prompt or an image prompt.

6. The device position correction method of claim 1, wherein when the limb detection model determines that the body part corresponding to the limb is a left limb, and a processor determines whether a position of a left limb wearable device is located on the left limb;
wherein when the processor determines that the position of the left limb wearable device is located on the left limb, and the left limb is within the preset range, a message indicating that it is being worn correctly is sent;
wherein when the processor determines that the position of the left limb wearable device is not located on the left limb, a message indicating that it is being worn incorrectly is sent.

7. The device position correction method of claim 6, wherein when the processor determines that the position of the left limb wearable device is located on a right limb, the processor exchanges a first identification code corresponding to a left body wearable device with a second identification code corresponding to a right body wearable device in a replacement program.

8. The device position correction method of claim 6, wherein when the processor determines that a position of a left body wearable device is located on a right limb, the processor exchanges a first feature code corresponding to the left body wearable device with a second feature code corresponding to a right body wearable device in a replacement program, to make sure that the first feature code records a right limb feature and the second feature code records a left limb feature.

9. The device position correction method of claim 6, wherein when the processor determines that the position of a left body wearable device is located on a right limb, the processor sends out a device-being-worn-incorrectly left-to-right error audio prompt or a device being worn incorrectly left-to-right error image prompt.

10. The device position correction method of claim 6, wherein when the processor determines that the position of the left body wearable device is located on a left limb, but the position of the left body wearable device is inverted, the processor sends out a device-being-worn-inverted audio prompt or a device-being-worn-inverted image prompt.

11. The device position correction method of claim 1, wherein after the limb detection model detects the skeleton points of the limb in the wearable device image, a processor determines whether a distance between the wearable device position and a specific skeleton point is less than a specific distance;
wherein when the processor determines that the distance between the wearable device position and the specific skeleton point is not less than the specific distance, the processor sends a wearing error audio prompt or a wear error image prompt.

12. A device position correction system, suitable for a wearable device, the device position correction system comprising:
a head-mounted display device (HMD), comprising:
a camera, configured to capture a wearable device image;
a storage device; and
a processor, configured to access an object detector and a limb detection model stored in the storage device to execute the object detector and the limb detection model; wherein the processor executes the following actions:
detect a wearable device position in the wearable device image using the object detector;
detect a plurality of skeleton points and a limb position of a limb in the wearable device image using the limb detection model to determine the body part corresponding to the limb; and
generate calibration information related the wearable device position according to the skeleton points and the limb position.

13. The device position correction system of claim 12, wherein the processor calculates the separation distance according to limb size and limb root;
wherein when the distance between the wearable device position and the limb root is equal to the separation distance, and the body part is within the preset range, the wearable device is being worn properly.

14. The device position correction system of claim 13, wherein when the distance between the wearable device position and the limb root is shorter than the separation distance, the processor sends a message to calibrate the wearable device downward through an audio prompt or an image prompt.

15. The device position correction system of claim 13, wherein when the distance between the wearable device position and the limb root is greater than the separation distance, the processor sends a message to calibrate the wearable device upward through an audio prompt or an image prompt.

16. The device position correction system of claim 12, wherein the limb detection model determines that the body part corresponding to the limb is a left limb, and a processor determines whether the position of a left limb wearable device is located on the left limb;
wherein when the processor determines that the position of the left limb wearable device is located on the left limb, and the left limb is within the preset range, a message indicating that it is being worn correctly is sent;
wherein when the processor determines that the position of the left limb wearable device is not located on the left limb, a message indicating that it is being worn incorrectly is sent.

17. The device position correction system of claim 16, wherein when the processor determines that the position of the left limb wearable device is located on a right limb, the processor exchanges a first identification code corresponding to a left body wearable device with a second identification code corresponding to a right body wearable device in a replacement program.

18. The device position correction system of claim 16, wherein when the processor determines that the position of a left body wearable device is located on a right limb, the processor exchanges a first feature code corresponding to the left body wearable device with a second feature code corresponding to a right body wearable device in a replacement program, to ensure the first feature code records a right limb feature and the second feature code records a left limb feature.

19. The device position correction system of claim 16, wherein when the processor determines that the position of a left body wearable device is located on a right limb, the processor sends out a device-being-worn-incorrectly left-to-right error audio prompt or a device-being-worn-incorrectly left-to-right error image prompt.

20. The device position correction system of claim 16, wherein when the processor determines that the position of the left body wearable device is located on a left limb, but the position of the left body wearable device is inverted, the processor sends out a device-being-worn-inverted audio prompt or a device-being-worn-inverted image prompt.

21. The device position correction system of claim 12, wherein after the limb detection model detects the skeleton points of the limb in the wearable device image, a processor determines whether the distance between the wearable device position of the wearable device and a specific skeleton point is less than a specific distance;
    wherein when the processor determines that the distance between the wearable device position and the specific skeleton point is not less than the specific distance, the processor sends a wearing error audio prompt or a wear error image prompt.

\* \* \* \* \*